United States Patent
Mullet et al.

[11] Patent Number: 5,929,580
[45] Date of Patent: Jul. 27, 1999

[54] SYSTEM AND RELATED METHODS FOR DETECTING AN OBSTRUCTION IN THE PATH OF A GARAGE DOOR CONTROLLED BY AN OPEN-LOOP OPERATOR

[75] Inventors: Willis J. Mullet, Pensacola Beach; Yan Rodriguez, Pace, both of Fla.

[73] Assignee: Wayne-Dalton Corp., Mt. Hope, Ohio

[21] Appl. No.: 08/906,529

[22] Filed: Aug. 5, 1997

[51] Int. Cl.[6] .................................................. H02P 3/00
[52] U.S. Cl. ............................... 318/466; 49/26; 160/292
[58] Field of Search ..................................... 318/280–286, 318/466–472, 460, 480; 49/26–30, 138; 160/291, 292, 292.1, 366, 310, 311

[56] References Cited

U.S. PATENT DOCUMENTS

| | | | |
|---|---|---|---|
| 3,470,653 | 10/1969 | Kalog | 49/139 |
| 3,608,612 | 9/1971 | Pemberton et al. | 160/188 |
| 3,635,277 | 1/1972 | Bahnsen | 160/191 |
| 3,728,605 | 4/1973 | Purtilo | 318/475 |
| 3,764,874 | 10/1973 | Geoffrey | 318/266 |
| 3,764,875 | 10/1973 | Harris | 318/266 |
| 3,813,590 | 5/1974 | Ellmore | 318/266 |
| 3,899,726 | 8/1975 | Ellmore | 318/472 |
| 3,996,697 | 12/1976 | Bailey et al. | 49/28 |
| 4,010,408 | 3/1977 | Bailey | 318/266 |
| 4,231,191 | 11/1980 | Ellmore | 49/28 |
| 4,234,833 | 11/1980 | Barrett . | |
| 4,300,660 | 11/1981 | Schoenmann et al. | 187/316 |
| 4,311,225 | 1/1982 | Tsubaki et al. | 192/142 |
| 4,394,607 | 7/1983 | Lemirande | 318/453 |
| 4,408,146 | 10/1983 | Beckerman . | |
| 4,464,651 | 8/1984 | Duhame | 340/521 |
| 4,511,832 | 4/1985 | Schmitz | 318/685 |
| 4,628,496 | 12/1986 | Lee | 367/93 |
| 4,638,433 | 1/1987 | Schindler | 364/400 |
| 4,701,684 | 10/1987 | Seidel et al. | 318/282 |
| 4,706,227 | 11/1987 | Du Vall et al. | 367/96 |
| 4,771,218 | 9/1988 | Mcgee | 318/16 |
| 4,831,509 | 5/1989 | Jones et al. | 364/167.01 |
| 4,855,653 | 8/1989 | Lemirande | 318/282 |
| 4,866,881 | 9/1989 | Morrow et al. | 49/25 |
| 4,994,724 | 2/1991 | Hsu . | |
| 5,153,560 | 10/1992 | Ichikawa | 340/522 |
| 5,218,282 | 6/1993 | Duhame | 318/603 |
| 5,233,185 | 8/1993 | Whitaker . | |
| 5,278,480 | 1/1994 | Murray | 318/626 |
| 5,357,183 | 10/1994 | Lin | 318/468 |
| 5,419,010 | 5/1995 | Mullet | 16/198 |
| 5,557,887 | 9/1996 | Fellows et al. | 49/28 |
| 5,585,702 | 12/1996 | Jackson et al. . | |
| 5,587,565 | 12/1996 | Schroder-Brumloop et al. | 187/316 |
| 5,596,840 | 1/1997 | Teich | 49/26 |

FOREIGN PATENT DOCUMENTS

| | | |
|---|---|---|
| 42 26 134 A1 | 2/1994 | Germany . |
| 2 291 225 | 1/1996 | United Kingdom . |

*Primary Examiner*—Jonathan Salata
*Attorney, Agent, or Firm*—Renner, Kenner, Greive, Bobak, Taylor & Weber

[57] ABSTRACT

An internal entrapment system for a garage door operator (30) includes a motor (48) for transferring a garage door (12) between first and second positions. Also included is a pulse counter (62) for detecting a speed of the garage door (12) during transfer between first and second positions; a potentiometer (56) for determining a plurality of positional locations of the garage door (12) during transfer between first and second positions separate from the pulse counter (62); and a control circuit (50) for calculating a motor torque value from the speed for each of the plurality of positional locations to compare with a plurality of door profile data points. The control circuit (50) takes corrective action if the difference between the motor torque value for each of the plurality of positional locations and the plurality of door profile data points exceeds a predetermined threshold. The control circuit (50) also updates the plurality of door profile data points to the motor torque values for each respective positional location if the predetermined threshold is not exceeded. In another embodiment both speed and position are detected by a slider element (58) which is connected to the control circuit (50). In yet another embodiment a sensor (60) detects non-movement of the door during an open/close cycle and stops operation of the motor (48).

19 Claims, 4 Drawing Sheets

SYSTEM AND RELATED METHODS FOR DETECTING AN OBSTRUCTION IN THE PATH OF A GARAGE DOOR CONTROLLED BY AN OPEN-LOOP OPERATOR

TECHNICAL FIELD

Generally, the present invention relates to detecting and measuring the motion, speed and position of a garage door as it travels between open and closed positions. More particularly, the present invention relates to an internal entrapment system which obtains and updates a force profile after each cycle of door travel. More specifically, the present invention relates to a system which employs a potentiometer to detect a position of the garage door and a pulse counter to detect the speed of the garage door, wherein the system compensates for changes in ambient temperature and wear of the mechanical components of the garage door.

BACKGROUND ART

As is well known, motorized garage door operators automatically open and close a garage door through a path that is defined by an upper limit and a lower limit. The lower limit is established by the floor upon which the garage door closes. The upper limit can be defined by the highest point the door will travel which can be limited by the operator, the counterbalance system, or the door track system's physical limits. The upper and lower limits are employed to prevent door damage resulting from the operator's attempt to move a door past its physical limits. Under normal operating conditions, the operator's limits may be set to match the door upper and lower physical limits. However, operator limits are normally set to a point less than the door's physical upper and lower limits.

Systems used to set operator limits are composed of switches used to terminate travel in the up and down directions. These mechanical switches are adjustable and can be used by the consumer or an installer to "fit" the door travel to a garage opening. These switches are mechanical and have a limited life span. Metal fatigue and corrosion are the most likely causes of switch failure. Another drawback of mechanical switches is that they can be wired in series with the motor which creates high current draw across the contacts of the switch causing the contacts to fail. A further limitation of limit switches is that the up and down limits, which must be set manually, can be improperly set or misadjusted.

Other limit systems employ pulse counters that set the upper and lower travel of the door by counting the revolutions of an operator's rotating component. These pulse counters are normally coupled to the shaft of the motor and provide a count to a microprocessor. The upper and lower limits are programmed into the microprocessor by the consumer or installer. As the door cycles, the pulse counter updates the count to the microprocessor. Once the proper count is reached, which corresponds to the count of the upper and lower limits programmed by the consumer or installer, the door stops. Unfortunately, pulse counters cannot accurately keep count. External factors such as power transients, electrical motor noise, and radio interference often disrupt the count allowing the door to over-travel or under-travel. The microprocessor may also lose count if power to the operator is lost or if the consumer manually moves the door while the power is off and the door is placed in a new position which does not match the original count.

Motorized garage door operators include internal entrapment protection systems designed to monitor door speed and applied force as the door travels in the opening and closing directions. During travel from the open to close and from close to open positions, the door maintains a relative constant speed. However, if the door encounters an obstacle during travel, the speed of the door slows down or stops depending upon the amount of negative force applied by the obstacle. Systems for detecting such a change in door speed and applied force are commonly referred to as "internal entrapment protection" systems. Once the internal entrapment protection is activated, the door may stop or stop and reverse direction.

Most residential operator systems are closed loop systems where the door is always driven by the operator in both the open to close to open directions. A closed loop system works well with the internal entrapment system wherein the operator is always connected to the door and exerting a force on the door when the door is in motion unless disconnected manually by the consumer. If an obstacle is encountered by the door, the direct connection to the operator allows for feedback to the internal entrapment device which signals the door to stop or stop and reverse. However, due to the inertia and speed of the door, and the tolerances in the door and track system, these internal entrapment systems are very slow to respond and some time passes after contacting an obstruction before the internal entrapment device is activated allowing the door to over-travel and exert very high forces on the object that is entrapped. Further, a closed loop operator system always has the capability of exerting a force greater that the weight of the door.

A method of internal entrapment protection on a closed loop system uses a pair of springs to balance a lever in a center position and a pair of switches to indicate that the lever is off-center signaling that an obstruction has been encountered. The lever is coupled to a drive belt or chain and balanced by a pair of springs adjusted to counterbalance the tension on the belt or chain so the lever stays centered. When an obstruction is encountered, the tension on the belt or chain overcomes the tension applied by the springs allowing the lever to shift off-center and contact a switch which generates an obstruction signal. Sensitivity of this system can be adjusted by applying more tension to the centering springs to force the lever to stay centered. This type of internal entrapment systems is slow to respond due to the inertia of the door, stretch in the drive belt or chain, and the components of the drive system.

Another method of the prior art on closed loop operator internal entrapment systems uses an adjustable clutch mechanism. The clutch is mounted on a drive component and allows slippage of the drive force to occur if an obstruction prevents the door from moving. The amount of slippage can be adjusted in the clutch so that a small amount of resistance to the movement of the door causes the clutch to slip. However, due to aging of the door system and environmental conditions that can change the force required to move the door, these systems are normally adjusted to the highest force condition anticipated by the installer or the consumer. Further, over time the clutch plates can corrode and freeze together preventing slippage if an obstruction is encountered. The drive systems on open loop operator systems are very efficient and can be back driven when the garage door is forced open as in a forced entry situation. Motor controls have been designed to use signals from the lower limit switch and the pulse counter to detect when this condition is occurring and start the motor to drive the door down again to its closed position. As mentioned before, the limit switches can fail and/or the pulse counter can miscount rendering this feature useless.

Another type of operator system is an open loop operator system wherein the door is not attached directly to the operator. In an open loop operator system when the door is moving from the closed to the open position, the door is lifted by the operator applying torque to the counterbalance system which reels in the cables attached to the door. When the door is moving from the open to closed position, the operator turns the counterbalance system to reel out the cables attached to the door and relies on gravity to move the door.

An open loop operator system has several advantages over a closed loop operator system. For example, the operator can never force the door to exert a downward force and any downward force can never be greater than the weight of the portion of the door that is in the vertical position. Further, vibrations from the operator and misalignments of the operator mountings will not affect movement of the door. The door and the operator are isolated from each other by the counterbalance system. Open loop operator systems are commonly used on vertical lift door systems where the door is always in the vertical position and has gravity exerting a downward force on the door at all times. However, open loop operators have not been successful in residential systems where the door is vertical when closed, but mostly horizontal when open. When the residential door is open, most of the weight of the door needed to affect the door's closing is carried by the horizontal track system. In an open loop operator system; however, when the door is beginning to close from the open position, there is only a small portion of the door in a vertical position. Therefore, only a small portion of the weight of the door is provided to initiate closing. In this condition, the door can bind or otherwise "hang up" and not continue to close. Further, if the door meets an obstruction during the motion from open to closed positions, only the weight of the portion of the door in the vertical position is applied to the obstruction. The gravity force creating the motion of the door in the open to closed direction is controlled by the counterbalance system wherein the cables that are attached to the bottom of the door are also attached to cable storage drums on the counterbalance system. As the operator turns the counterbalance system to peel off cables, gravity causes the door to move. This movement of the door and the counterbalance system causes the cable storage drums to turn, peeling off cable and at the same time cause winding of the springs inside the counterbalance system which store energy equal to the portion of the door that is in the vertical position. At anytime during normal movement of the door from open to close and close to open, the torsional energy stored in the counterbalance springs is about equal to the weight of the portion of the door in the vertical position. This close-to-balance condition between the door's weight in the vertical position and the energy stored in the counterbalance springs creates a condition in an open loop operator system that if there is a resistance to the movement of the door, the door will "hang up" and not move when the operator is peeling off cable. This "hang up" condition is where the door is not moving, but the operator is turning the counterbalance system and peeling off cable. This condition can be at any point of the door's travel from the open to the closed position, but is more prevalent when the door is open and beginning to close or if an obstruction is encountered during the closing cycle. If a "hang up" occurs and the cables are peeled off of the cable storage drums there is no longer a balanced condition between the energy stored in the counterbalance system and the weight of the door in the vertical position. When this unbalanced condition occurs, the cables become tangled around the cable storage drums requiring service before the door can be operated again or, worse, the door becomes dislodged and may come crashing down like a guillotine. This sudden movement of the door could cause injury or property damage. For these and other reasons, open loop operator systems have not been commercially successful due to the lack of motor controls needed to address these conditions.

Control of the cables on the cable storage drums is essential for open loop operator systems. Many methods have been employed such as mechanical cable snubbers and tensioners in an attempt to keep the cables from jumping off of the cable storage drums or becoming entangled. This control is made more difficult with lighter garage door panels or sections which have significantly reduced the weight of a garage door. Electrical means have also been employed to prevent the cables from jumping off of the cable storage drums or becoming entangled by means of pulse counters, cable tension switches, and current sensing devices. The mechanical snubbers or tensioners are not reliable due to wear and corrosion and the electrical methods fail for the same reasons mentioned above. In addition to using the aforementioned pulse counters to set the upper and lower limits of door travel, they may also be used to monitor the speed of the garage door to provide yet another method of internal entrapment. The optical encoders used for speed monitoring are normally coupled to the shaft of the motor. An interrupter wheel disrupts a path of light from a sender to a receiver. As the interrupter or chopper wheel rotates, the light path is reestablished. These light pulses are then sent to a microprocessor every time the beam is interrupted. Alternatively, magnetic flux sensors function the same except for the fact that the chopper wheel is made of a ferromagnetic material and the wheel is shaped much like a gear. When the gear teeth come in close proximity to the sensor, magnetic flux flows from the sender through a gear tooth and back to the receiver. As the wheel rotates, the air gap between the sensor and the wheel increases. Once this gap becomes fully opened, the magnetic flux does not flow to the receiver. As such, a pulse is generated every time magnetic flux is detected by the receiver. Since motor control circuits used for operators do not have automatic speed compensation, the speed is directly proportional to the load. Therefore, the heavier the load, the slower the rotation of the motor. The optical or magnetic encoder counts the number of pulses in a predetermined amount of time. If the motor slows down, the count is less than if the motor moved at its normal speed. Accordingly, the internal entrapment device triggers as soon as the number of pulses counted falls below a manually set threshold during the predetermined period of time.

While the optical encoder wheels or magnetic flux pick-up sensors may be employed with closed loop systems, this method of entrapment protection cannot accurately detect the down motion of an open loop system wherein the door is not directly attached to the operator. This condition is made worse by the use of very light doors which require very little counterbalance torsional force. If the door does not move at the beginning of the close cycle, when the weight of the door against the counterbalance systems is the lowest and the tension from the springs are the lowest, the motor can make several revolutions and the drums can peel off a considerable amount of cable before the torsional force of the springs, no longer counterbalanced by the weight of the door, induces enough force on the motor to slow the motor for the pulse counter system to detect and trigger the internal entrapment system.

From the foregoing discussion it will be appreciated that as a residential garage door travels in the opening and closing directions, the force needed to move the garage door varies depending upon the door position or how much of the door is in the vertical position. Counterbalance springs are designed to keep the door balanced at all times if the panels or sections of the door are uniform in size and weight. The speed of the door panels as they traverse the transition from horizontal to vertical and from vertical to horizontal can cause variations in the force requirement to move the door. Further, the panels or sections can vary in size and weight by using different height panels together or adding windows or reinforcing members to the panels or sections. In prior art devices, these variations cannot be compensated for. To compensate for these variations, a force setting must be set to overcome the highest force experienced to move the door throughout the distance the door travels. For example, the force to move door could be as low as 5 to 10 pounds at the first of the movement and increase to 35 to 40 pounds at another part of the movement. Therefore, the force setting on the operator must be least 41 pounds to assure the internal entrapment device will not activate. If an obstacle is encountered during the time the door is in the 35 to 40 pound region, it will take only 1 to 6 pounds of force against the object to activate the internal entrapment device. However, if the door is in the 5 to 10 pound region, the door will up to 31 to 36 pounds of force against the object before the internal entrapment device activates. To exacerbate this condition, the force adjustments on these internal entrapment devices can be adjusted by the consumer or the installer to allow the operator to exert several hundred pounds of force before the internal entrapment device will activate. As such, it is common to find garage door operators that can crush automobile hoods and buckle garage door panels before the internal entrapment system is triggered.

Two patents have attempted to address the shortcomings of properly triggering internal entrapment systems. One such patent, U.S. Pat. No. 5,278,480 teaches a microprocessor system which learns the open and closed position limits as well as force sensitivity limits for up and down operation of the door. This patent also discloses that the closed position limit and the sensitivity limits are adaptably adjusted to accommodate changes in conditions to the garage door. Further, this system may "map" motor speed and store this map after each successful closing operation. This map is then compared to the next closing operation so that any variations in the closing speed indicate that an obstruction is present. Although this patent is an improvement over the aforementioned entrapment systems, several drawbacks are apparent. First, the positional location of the door is provided by counting the rotations of the motor with an optical encoder. As discussed previously, optical encoders and magnetic flux pickup sensors are susceptible to interference and the like. This system also requires that a sensitivity setting must be adjusted according to the load applied. As noted previously, out of balance conditions may not be fully considered in systems with an encoder. Although each open/close cycle is updated with a sensitivity value, the sensitivity adjustment is set to the lowest motor speed recorded in the previous cycle. Nor does the disclosed system consider an out-of-balance condition or contemplate that different speeds may be encountered at different positional locations of the door during its travel.

Another patent, U.S. Pat. No. 5,218,282, also provides an obstruction detector for stopping the motor when the detected motor speed indicates a motor torque greater than the selected closing torque limit while closing the door. The disclosure also provides for at least stopping the motor when the detected motor speed indicates that motor torque is greater than the selected opening torque limit while opening the door. This disclosure relies on optical counters to detect door position and motor speed during operation of the door. As discussed previously, the positional location of the door cannot be reliably and accurately determined by pulse counter methods.

DISCLOSURE OF INVENTION

Therefore, an object of the present invention is to provide an internal entrapment system to monitor door speed and applied force as the door travels in the opening and closing directions, wherein if the door encounters an obstacle during opening and closing, the door speed and applied force will change. Another object of the present invention is to stop and reverse or just stop travel of the door if predetermined thresholds in door speed and applied force are not met. Still another object of the present invention is to generate door profile data during an initial door open and close cycle and whereupon the door profile data and predetermined thresholds are updated after each cycle.

Another object of the present invention is to provide an internal entrapment system with a processor control system that monitors input from a potentiometer coupled to the door, a thermistor that detects ambient temperature, and a pulse counter to determine motor torque and thus the speed of the door as it travels. A further object of the present invention is to provide a processor control system that generates door profile information based upon various inputs and stores this data in nonvolatile memory. Yet another object of the present invention is to provide a setup button connected to the processor control system to allow for an initial generation of door profile data, wherein the processor reads door position, temperature and speed of the door for a plurality of door positions in both opening and closing directions. Still another object of the present invention is to provide a processor which calculates motor torque from the speed readings and then adjusts these values depending upon the temperature readings to generate an offset value which is associated with a particular door position and then stored into the nonvolatile memory along with upper and lower door profiles.

Another object of the present invention is to provide an internal entrapment system in which a processor control system reads door profile information during each cycle of the door position and compares the new information with the previously stored information and wherein if the new force profile varies from the stored force profile a predetermined amount, travel of the door is stopped and reversed.

Another object of the present invention is to provide an internal entrapment system with a potentiometer that is coupled to the door to determine the exact position of the door. A further object of the present invention is to provide a potentiometer with two end points and a slider that is coupled to the door to output a voltage value relative to the position of the door. Yet a further object of the present invention is to provide a potentiometer that detects door position even if the door is moved while power is removed from the internal entrapment system and the potentiometer.

Another object of the present invention is to provide a continuous closing system and an automatic opening system that uses a potentiometer coupled to the door, a thermistor that detects ambient temperature, a mounted sensor to detect motion of the door, and a pulse counter attached to the motor providing information to a processor control system that monitors door movement in the open direction when the motor is off and, based on the door location when the motion occurs, will either start the motor and open the door or start the motor and close the door.

Another object of the present invention is to provide an internal entrapment system which employs a mounted sensor to detect motion of a moving door and wherein if the sensor detects non-movement of the door, instructions are sent to a motor control circuit to stop travel of the door. Yet a further object of the present invention is to employ a sensor that transmits and receives either acoustic or light signals that are incident upon and reflected by the door as it travels, and whereupon consecutive reflected signals that have the same magnitude indicate a condition that door movement has been obstructed and that the motor should stop movement. Still a further object of the present invention is to employ a sensor to detect motion of a moving door in conjunction with an internal entrapment system which includes a processor that generates and maintains door profile data. Still yet a further object of the present invention is to provide an internal entrapment system that effectively operates over the life of the garage door with minimal adjustment to the mechanical parameters of the garage door.

In general, the present invention contemplates an internal entrapment system for a garage door operator, comprising a motor for transferring the garage door between first and second positions; means for detecting a speed of the garage door during transfer between first and second positions; means for determining a plurality of positional locations of the garage door during transfer between first and second positions separate from said detecting means; and controller means for calculating a motor torque value from the speed for each of said plurality of positional locations to compare with a plurality of door profile data points, wherein said controller means takes corrective action if the difference between the motor torque value for any one of said plurality of positional locations goes beyond a predetermined threshold for a respective one of said plurality of door profile data points, otherwise said controller means updates said plurality of door profile data points to the motor torque values for each respective said plurality of positional locations.

BEST MODE FOR CARRYING OUT THE INVENTION

Figure 1:
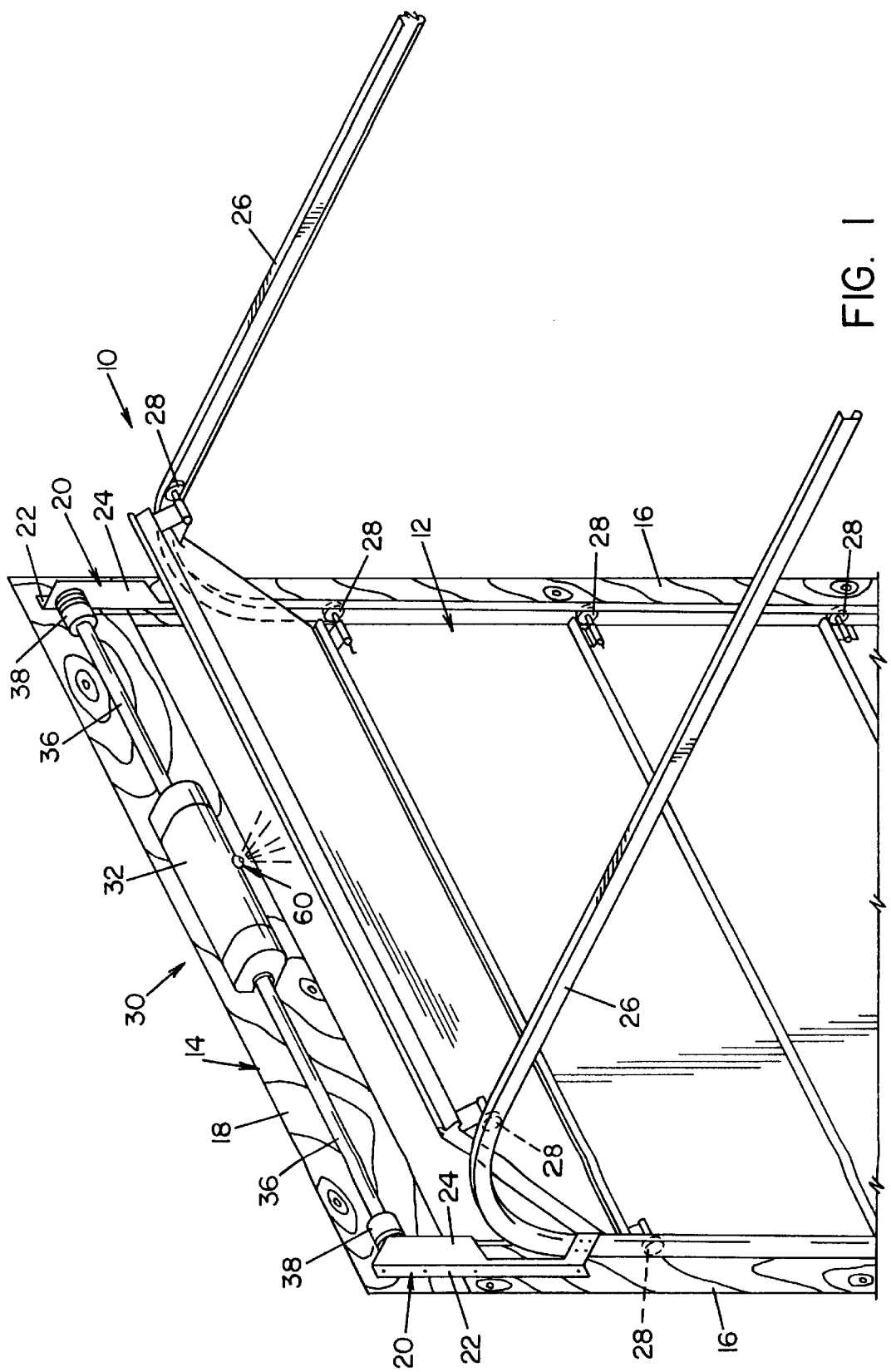
FIG. 1 is a fragmentary perspective view depicting a frame for a sectional garage door and showing an operator mechanism with an internal entrapment system embodying the concepts of the present invention.

A system and related methods for detecting and measuring the operational parameters of a garage door is generally indicated by the numeral 10 in FIG. 1 of the drawings. The system 10 is employed in conjunction with a conventional sectional garage door generally indicated by the numeral 12. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground (not shown). The jambs 16 are spaced and joined at their vertically upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
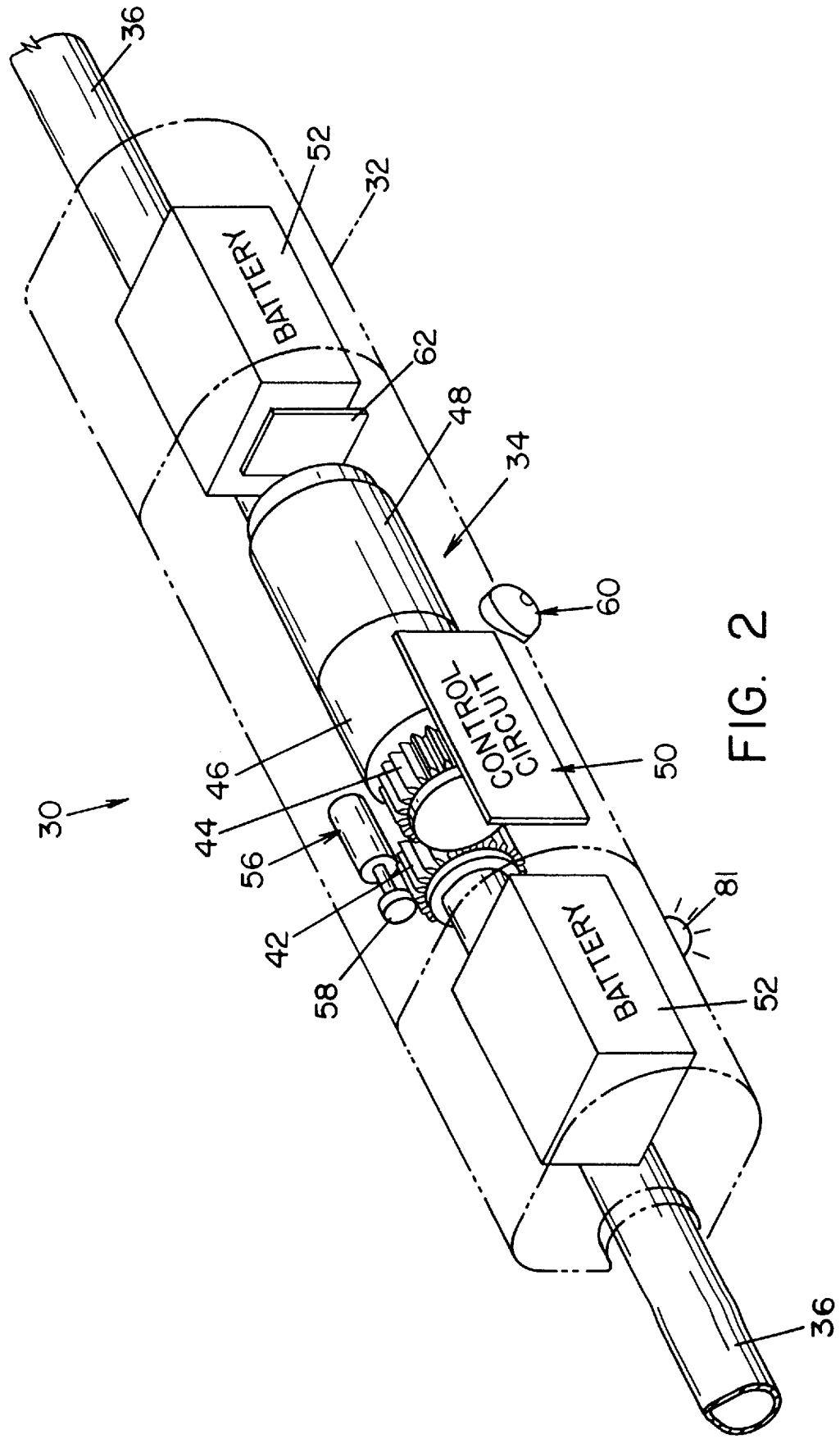
FIG. 2 is an enlarged fragmentary schematic view of the operator mechanism of FIG. 1 as viewed from the inside of the sectional garage door.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counterbalancing system 30 includes a housing 32, which is affixed to the header 18 at about a midpoint thereof and which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24.

The drive shaft 36 provides the necessary mechanical power to transfer the garage door 12 between closing and opening positions. The drive shaft 36 provides a drive gear 42 at about a midpoint thereof wherein the drive gear 42 is coupled to a motor gear 44. Driving motion of the motor gear 44 is controlled through a gear box 46 by a motor 48 in a manner well known in the art.

A control circuit 50, which is contained within the housing 32, monitors operation of the motor 48 and various other elements contained within the operator mechanism 34 as will be described hereinbelow. Batteries 52 may be connected to the drive motor 48 for the purpose of energizing the motor 48 and the control circuit 50 to provide any power required for the operation thereof.

A potentiometer generally indicated by the numeral 56 is connected to the drive gear 42 for the purpose of determining positional location of the door 12. The potentiometer 56 may also be employed to provide a speed value for the garage door as it travels between opening and closing positions. To this end, a slider 58 extends from the potentiometer 56 and is coupled to the drive gear 42 to monitor the positional rotation of the drive gear. A sensor 60, which may either be ultrasonic or infrared, is employed to monitor travel of the garage door 12. The sensor 60 is also connected to the control circuit 50 for communication therewith and to stop operation of the counterbalancing system 30 when deemed appropriate.

A pulse counter 62 is employed to monitor rotation and speed of the motor 48 in a manner well known in the art. The pulse counter 62 is connected to the control circuit 50 for the purpose of supplying input thereto and allowing the control circuit 50 to take corrective action when required.

Figure 3:
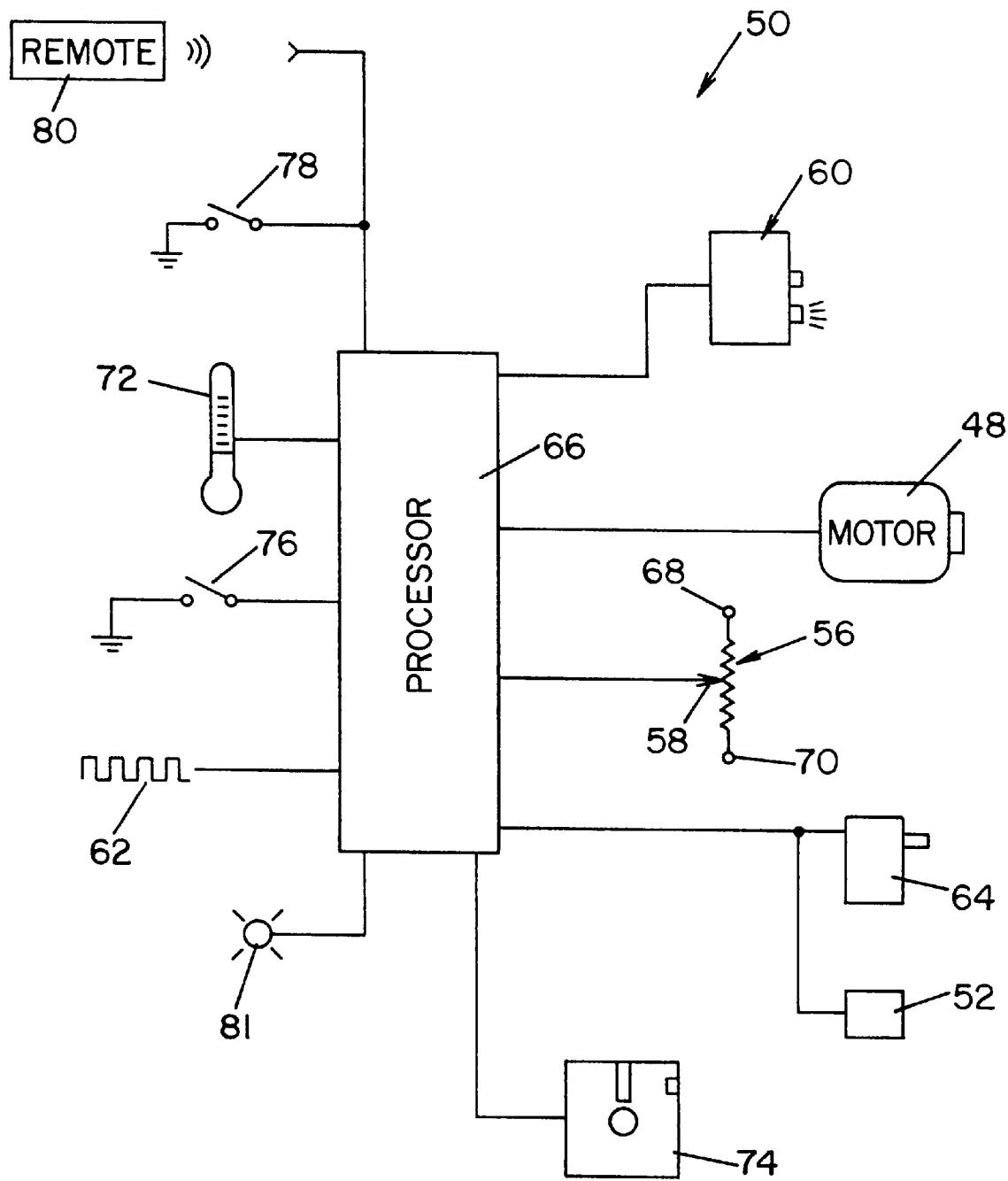
FIG. 3 is a schematic view of the control circuit of the operator mechanism employed in the internal entrapment system.

Referring now to FIGS. 2 and 3, it can be seen that the control circuit 50 employs a processor 66 which receives power from the batteries 52 or from an appropriate power supply 64. The processor 66 includes the necessary hardware, software and memory to implement operation of the control circuit 50. The potentiometer 56 is also connected to the processor 66 wherein it can be seen that the potentiometer includes a first end point 68 and a second end point 70 with the slider 58 disposed therebetween. In essence, the potentiometer 56 is a variable resistor, wherein the two end points 68, 70 have an electrical potential applied across them. If the slider 58 is moved toward the end point with the positive potential, then the slider voltage becomes more positive. If the slider 58 is moved towards the end point with the negative potential, then the slider voltage becomes more negative. By connecting the slider 58 to the door 12 through the drive gear 42, the potentiometer 56 always outputs a voltage relative to the position of the door 12. If the power supply, for whatever reason, is removed from the control circuit 50, the slider 58 still points to a position relative to the door 12. If a user moves the door while the operator mechanism 34 is off, the slider 58 maintains a relative position with respect to the door and is reacquired once power is returned to the operator mechanism 34.

Also connected to the processor 66 is a thermistor 72, which is a resistance value that changes according to the ambient temperature, is also connected to the processor 66 for inputting a necessary operation parameter that will be discussed in further detail below. Also connected to the processor 66 is a nonvolatile memory circuit 74 for storing information that would otherwise be lost if power is removed from the processor 66.

Operation of the operator mechanism 34 and the control circuit 50 is controlled by a set-up button 76, an open/close button 78 and a remote open/close button 80.

Generally, the internal entrapment system embodied in the operator mechanism 34 utilizes door profile data acquired during a set-up or installation routine to determine the appropriate force limits for when the door is opening and for when the door is closing. A new door profile data is saved in the nonvolatile memory 74 every time the door 12 is cycled. The door profile data contains door position and force applied to the door 12 for a plurality of points during the operation cycle. The potentiometer 56 is employed to detect door position throughout the operation cycle while a pulse counter 62 is employed to calculate speed which is related to a torque value. Force adjustments applied by the operator mechanism 34 are automatically set during a set-up routine, and as such, no user controls are needed to set the force limits. The only input provided from the user is the actuation of the set-up button 76. Once the set-up routine is complete, the internal entrapment system triggers whenever the force applied exceeds a plus/minus 15 pound limit for each monitored door position throughout the operational cycle. It will be appreciated, however, that different threshold settings are possible by reprogramming the processor 66.

Once the operator mechanism 34 is installed and coupled to the door 12, it will be appreciated that there is no door data profile present within the nonvolatile memory 74. In order to initially program the door profile data, the installer or user must actuate the set-up button 76 which allows the operator mechanism 34 to move the door 12. If the slider 58 is higher than the middle travel position, the potentiometer 56 reading becomes the upper limit. If the slider 58 is lower than the middle travel position, the potentiometer 56 reading becomes the lower limit. Once the initial limit (high or low) is read, the processor 66 commands the operator mechanism 34 to move the door up, if the slider position is lower than the middle travel position, or down, if the slider position is higher than the middle travel position. As the door 12 moves, its speed is measured and the processor 66 compares successive door speed readings and saves the slowest and highest speeds. If the door slows down past a factory pre-set threshold speed limit, the operator mechanism 34 stops travel of the door 12. In other words, the pre-set threshold indicates that the door has struck the floor or is fully open and can move no further. Once the door 12 is stopped, the new positional location of the door becomes the second limit, that is a low or high limit depending upon the initial limit reading. Therefore, if the door was going up, then the new reading is the up limit. If the door was going down, then the new reading is the down limit. These limit readings along with the slowest and highest speed readings are stored by the processor 66 in the nonvolatile memory 74. At this point, the operator limits and force settings are permanently programmed into the processor 66 and nonvolatile memory 74. This is referred to as the profile acquisition routine. As the door 12 moves, the processor 66 reads the door position from the potentiometer 56, the associated ambient temperature from the thermistor 72 and an associated speed value from the pulse counter 62. Once the door reaches its travel limit, the door 12 reverses direction and continues reading data points from the potentiometer 56, the thermistor 72 and the pulse counter 62. Prior to storing these associated data points in the nonvolatile memory 74, the processor 66 estimates a motor torque value from the speed readings generated by the pulse counter 62. This estimated torque value it then processed with the ambient temperature value to obtain an off-set value. This off-set value, for each of the door profile data points, is stored into the nonvolatile memory 74 and corresponds to a particular door position provided by the potentiometer 56. Accordingly, both the upper and lower door profiles are stored in the nonvolatile memory 74.

Once the door profile data is programmed, the user does not need to push the set-up button 76 again, unless the door 12 or counterbalance springs contained within the counterbalancing system 30 are changed. During normal door operation, the user either actuates the open/close button 78 or the remote open/close button 80 to begin an opening or a closing cycle. At this time, the processor 66 reads and processes the speed, the temperature and the position in the same manner as it did during the profile acquisition mode. Prior to reading the next door profile data point, the processor 66 compares the newly acquired door profile data point with the corresponding point stored in the nonvolatile memory 74. If this newly acquired value varies more than about plus/minus 15 pounds, then the door stops if it is moving up or the door reverses if it was in the midst of a downward cycle. In other words, if one of the newly acquired motor torque values and related offset values for a particular positional location goes beyond or exceeds a predetermined threshold of the door profile data point for a particular location, the operator mechanism 34 takes the necessary corrective action.

In the event the newly acquired torque value varies less than the plus/minus 15 pounds or other predetermined threshold, then the processor 66 replaces the previously stored profile data with the newly acquired value. This "profile updating" is necessary for the fully automated operation of the garage door 12. Those skilled in the art will appreciate that as the door ages, the springs contained within the counterbalancing system 30 become weaker and the door develops more drag. As the frictional drag increases, the operator encounters a greater amount of imbalance in the system. By updating the profile every time the door cycles, the internal entrapment system ensures that the operator will not falsely trigger due to a normal change in the door weight characteristics. Moreover, by including an ambient temperature measurement in the newly acquired profile point any variation in the operation of the garage door due to temperature is accounted for. In other words, the processor 66 updates the plurality of door profile data points to the motor torque and temperature values for each of the respective plurality of positional locations if the predetermined threshold is not exceeded by any of the differences between the motor torque values and the plurality of door profile data points.

The processor 66 may also be programmed to account for an underbalanced condition of more than 45 pounds. The user of the door may be notified of this condition by flashing an overhead light 81, which is connected to the processor 66, for a few seconds indicating that it is unsafe. In other words, the flashing of overhead light 81 annunciates an out of balance condition between the door 12 and the counterbalance system 30. A further safety precaution may be provided whenever the out of balance condition exceeds 70 pounds. In this instance, the operator will not be allowed to move the door 12 unless there is constant pressure applied to the open/close button 78.

Based upon the foregoing description it will be appreciated that the internal entrapment system provided by the operator mechanism 34 takes into account the travel unbalance condition. As such, the user does not need to set the upper and lower force limits manually. Additionally, the entrapment system will not allow the operator to exceed the trigger force no matter how unbalanced the force is. Since the user cannot adjust the upper and lower force adjustments to full force, the operator is not capable of applying a large force onto an obstacle between the internal entrapment system triggers. A further advantage of the present invention is that the internal entrapment system is less prone to false trigger due to the fact that it automatically compensates for changes in ambient temperature. Still another advantage of the present invention is realized by virtue of the potentiometer 56 which provides a positive door position regardless of the operation of the motor 48. Accordingly, if power is ever removed from the operator mechanism 34 and then reapplied, the slider 58 within the potentiometer 56 remains associated with a particular door position. In the event the door is moved when the power is off, the slider is also moved and provides a positive location of the door.

In another embodiment of the present invention it will be appreciated that the potentiometer 56 may also provide the limits and speed detection for the processor 66. As discussed previously, the slider 58 generates a voltage relative to the position of the door 12. Analog signals from the slider enter the processor 66 while all processing is performed. The nonvolatile memory 74 is employed by the processor 66 to permanently store the values for the upper and lower limit and the values for the up direction force adjustment and the down direction force adjustment. The processor 66 contains the necessary analog to digital conversion to allow for processing of the analog voltage generated by the slider 58. A speed value for the moving door is determined by timing the changes between predetermined door positions.

In this embodiment the set-up procedure is very similar to the first embodiment wherein the set-up button 76 is pressed to read the position of the door 12 which becomes the upper limit or lower limit depending on the position of the slider 58. The only difference being that the potentiometer 56 also functions to provide the speed readings. If there is ever a need to re-set the door settings, the user just presses the set-up button 76 to repeat the above process.

Once the main operational buttons 78 or 80 are pressed, the processor 66 uses the upper limit reading to indicate when the door needs to stop on the way up. On the way down, the processor 66 uses the bottom limit reading to get a "coarse" limit stop. As the door travels on the way down, the operator mechanism 34 and control circuit 50 turns off the internal entrapment protection one inch prior to reaching the lower limit. With the internal entrapment protection off, the operator mechanism 34 will not reverse if it encounters an obstacle. Instead, the operator will stop if it encounters an obstacle, usually the floor, one inch before reaching the programmed bottom limit. If the door 12 encounters the obstacle one inch before the lower limit, then that point becomes the new lower limit. This new limit reading from the potentiometer 56 replaces the old reading in the nonvolatile memory 74. If the door 12 does not encounter an obstacle before reaching the programmed limit, then the door is allowed to go one inch past the lower limit. If the operator does not encounter an obstacle after the extended one inch travel, then the door stops and reverses. If the door 12 encounters an obstacle lower than the programmed limit, but before the once inch extended travel, then the new reading becomes the new lower limit replacing the old value in the nonvolatile memory 74.

The speed of the door 12 during normal opening and closing cycles is continuously monitored by the processor 66. Readings from the potentiometer 56 are compared with the high and low speed values stored in the nonvolatile memory 74. The programming of the processor 66 allows the readings to vary no more than the equivalent of 15 pounds of force lower or higher than the pre-programmed readings. Since the speed of the motor 48 is directly proportional to the force applied to the door 12, the processor calculates the speed which is equivalent to 15 pounds of force. If the new speed readings are above the pre-programmed thresholds, but lower than 15 pounds of force, then the new readings replace the old readings in the nonvolatile memory 74. However, if the processor 66 detects that the door 12 is applying any force greater than the upper force limit (high speed value) plus 15 pounds, then the door stops if moving up or reverses if moving down. If the processor detects the door applying force less than the lower force limit (low speed value) minus 15 pounds, then the door stops if moving up or reverses if moving down.

The advantages of this embodiment will be appreciated by the cost savings of using a single potentiometer element to detect upper and lower limits, speed of the door during travel between open and close positions and the position of the door instead of using pulse counters and switches. As discussed previously, the potentiometer 56 is not effected by power outages and provides a longer life expectancy than would a switch. Additionally, use of the potentiometer reduces any adverse affects resulting from radio frequency interference. Additionally, contact failure due to arcing is not a factor since the potentiometer 56 does not function as a switch.

Figure 4:
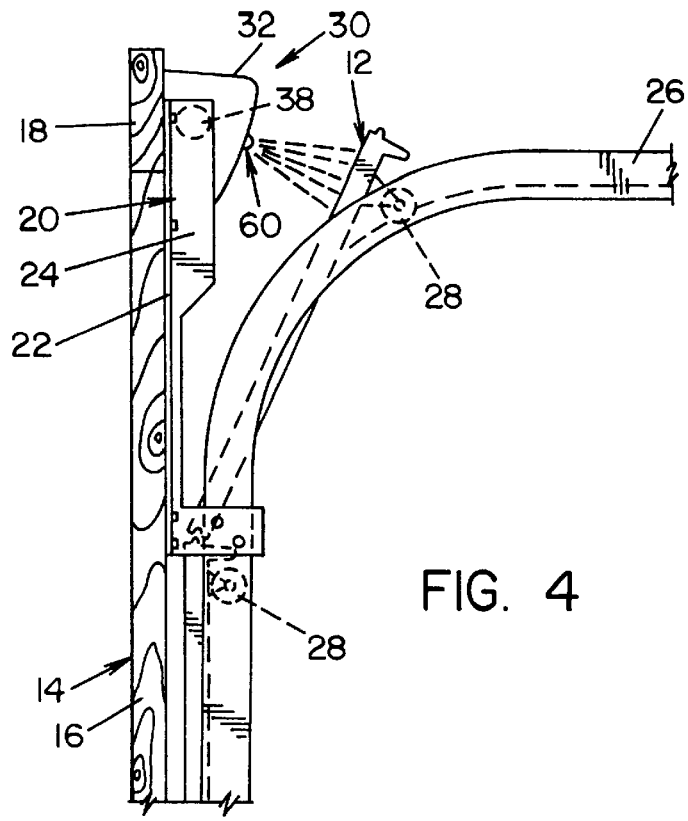
FIG. 4 is a fragmentary side elevational view of the sectional garage door showing the relationship of the sensor therewith.
Figure 5:
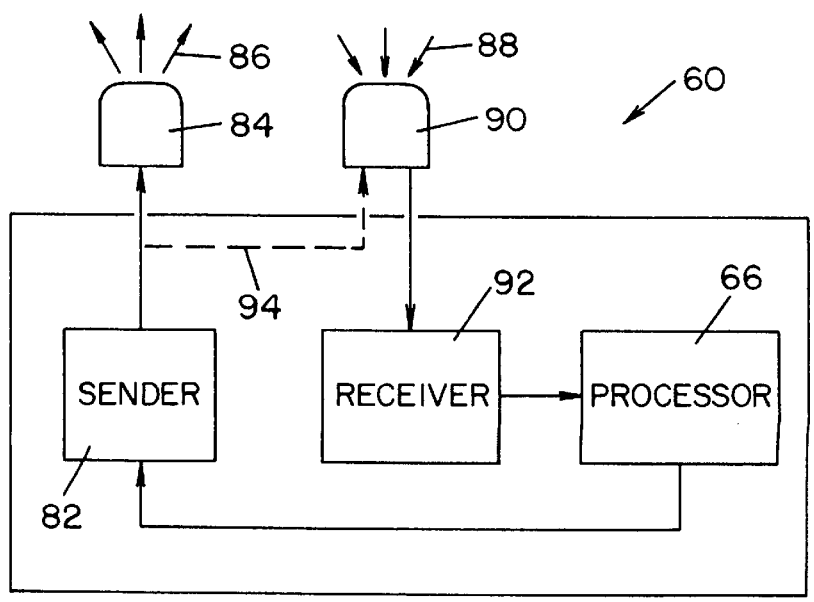
FIG. 5 is a schematic view of the sensor which may be used in conjunction with the internal entrapment system.

An additional feature which may be employed with the previous two embodiments or alone is incorporation of the sensor 60 to detect door motion that is unrelated to the operation of the motor 48. As best seen in FIGS. 4 and 5, the sensor 60 includes the processor 66 which is connected to a sender unit 82 which drives a transmitter 84 that generates an incident signal 86 that is directed to the sectional panels of the garage door 12. It will be appreciated that the transmitter 84 may be one that emits sound waves or light waves to detect motion. After the incident signal 86 has been reflected by the door 12, a reflected signal 88 is received by a receiver 90. This receiver 90 is connected to a receiver unit 92 which transmits the received signal to the processor 66 for comparison to previously generated received signals. Alternatively, the receiver 90 could be configured as a transceiver by a transceiver line 94 connecting the sender unit 82 to the receiver 90. Accordingly, both the incident signal and reflected signals 86 and 88, respectively, would be routed through the receiver 90.

The sensor 60 does not require a closed loop system in order to determine door motion, instead it depends only on having an unobstructed line of sight to the door 12 as it travels through its horizontal to vertical positions or vice versa, where the motion of the door is greatest during the opening and closing cycles. Since the sensor is "looking" at the door, it does not depend on motor torque or cams, springs, and levers to determine whether the door is moving or if an obstruction has been encountered. If the sensor 60 is an acoustic type, many frequencies may be used depending on the transducer, distance to target and how wide an area (dispersion) needs to be covered. As those skilled in the art will appreciate, there is a functional relationship between the frequency, the distance between the door 12 and the transducer, and the dispersion. Accordingly, the slower the frequency, the greater the distance range and the dispersion rate. Increasing the frequency narrows the view of the sonar or sensor and also its range. This frequency value may be set at the time of manufacture of the operator mechanism 30. The receiver unit also employs a transducer to "listen" for the reflected signal. As discussed previously, a separate transducer receiver unit may be used or the same sender transducer may provide the listening function. As the reflected signals 88 are received, they are amplified by the receiver unit 92. The amplified echoes or light signals are submitted to a window comparator such that if an echo varies in amplitude to a previous echo, then the window comparator initiates a trigger. These triggers are submitted to the processor 66 where a decision is made as to whether to continue door motion or to stop the door motion.

If the door does not move, the return echoes will be similar to previous return echoes and as such, will not trigger the window comparator. The absence of these window triggers is seen by the processor 66 as non-motion thus causing the internal entrapment system to actuate.

The processor 66 monitors the rate and duration of trigger pulses emanating from the receiver unit 92. The processor 66 also controls the initialization of the sending unit 82. Therefore, incident signals 86 are only generated when the door 12 begins to move. As the door travels through the radius (horizontal to vertical\vertical to horizontal), the distance of the panel in relation to the sensor 60 is constantly changing. As the sectional panels of the door 12 move, the surface in which the incident waves bounce constantly changes. This angular change causes the reflective signals 88 to have varying amplitudes.

It will be appreciated that there may be "dead spots" on a door in which the angular change in relationship to the sensor 66 does not change. In this case, multiple sensors may be provided in connection with the processor 66 to minimize the likelihood of "dead spots."

Based upon the foregoing discussion of the structure and operation of the sensor 60, several advantages are readily apparent. The sensor 60 in combination with the operator mechanism 34 can always detect the "hang-up" in open loop garage door opener systems or the condition where the door is in its most horizontal position and the counterbalance system is at its lowest torsional force. This embodiment employing the sensor 60 responds almost instantaneously to a non-movement of the door without the delay of waiting on cam, levers, and springs to respond. Furthermore, the device has the advantage of being very sensitive in that it does not rely on components that have manufacturing tolerance, such as the cams, levers and springs, and does not require sensitivity adjustments during the life of the operating mechanism or tuning to optimize performance. This sensor 60 works equally well on closed loop systems such as trolley-mounted operators and the like. A further advantage of the present embodiment is that the sensor 60 monitors the door directly and does not have sources of error such as friction in the gears, belts and chain links, nor will it be adversely affected by looseness or slack in the components of the door, track and counterbalance systems. Still another advantage of the present embodiment is that the sensor 60 and operating mechanism 34 do not depend on or monitor forces applied by obstacles on the door but rather on motion of the door.

The sensor 60 may also be used to provide a continuous closing system and an automatic opening system. In conjunction with the potentiometer 56, the thermistor 72 and the pulse counter 62, the sensor 60 may be employed to initiate movement of the door whenever an opening or closing motion is detected. In other words, if the door is closed and the motor or operator is off, and the sensor 60 detects motion of the door, the processor 66 instructs the motor to take over the closing cycle. This feature is desirable to enhance the locking feature of the door system. Any motion, manually initiated or otherwise, detected by the sensor 60 when the door is open (except for the upper limit position) and the motor is off, automatically causes the motor to initiate an opening cycle. This feature is desirable to prevent a user from lifting a door by hand and causing the counterbalance cables to peel off the drums.

Thus, it should be evident that the system and related methods for detecting and measuring the operational parameters of a garage door 10 disclosed herein carries out the various objects of the present invention set forth above and otherwise constitutes an advantageous contribution to the art. As will be apparent to persons skilled in the art, modifications can be made to the preferred embodiments disclosed herein without departing from the spirit of the invention. For example, it will be appreciated that the potentiometer may be used solely to determine the positional location of the door or may be used to also determine the speed of the door as it travels between opening and closing positions. Moreover, the sensor 60 may be used in conjunction with either of the first two embodiments or by itself to detect non-motion of a garage door. Therefore, the scope of the invention herein described shall be limited solely by the scope of the attached claims.

We claim:

1. An internal entrapment system for a garage door controlled by an open loop garage door operator, comprising:
   a counter-balancing system for transferring the garage door from a first to a second position, wherein said counter-balancing system includes a motor with a drive shaft that only drives the door from said first position to said second position, said counter-balancing system allowing the door to move from said second position to said first position and allowing rotation of said drive shaft;

means for detecting a speed of the garage door during transfer between first and second positions solely from said drive shaft;

means for determining a plurality of positional locations of the garage door during transfer between first and second positions, wherein said determining means is separate from said detecting means; and controller means for calculating a motor torque value from said detecting means for each of said plurality of positional locations from said determining means to compare with a plurality of door profile data points, wherein said controller means takes corrective action if the difference between the motor torque value for any one of said plurality of positional locations goes beyond a predetermined threshold for a respective one of said plurality of door profile data points, otherwise said controller means updates said plurality of door profile data points to the motor torque values for each respective said plurality of positional locations.

2. The system according to claim 1, further comprising:
a thermistor directly connected to said controller means for detecting an ambient temperature value, wherein said thermistor is separate from the operation of said motor and which is employed to offset each of said motor torque values for each of said plurality of positional locations.

3. The system according to claim 1, wherein said determining means comprises
a potentiometer having a slider movable between two voltage points wherein said slider is coupled to said motor to determine a positional location of the door between the first and second positions.

4. The system according to claim 1, further comprising:
a thermistor directly connected to said controller means for detecting an ambient temperature value, wherein said thermistor is separate from the operation of said motor and which is employed to offset each of said motor torque values for each of said plurality of positional locations to generate said plurality of door profile data points;
a nonvolatile memory connected to said controller means for storing said plurality of door profile data points; and
means for initially establishing said plurality of door profile data points by activating said motor to initiate movement between said first and second positions while said controller means collects data from said detecting means, said determining means, and said thermistor to calculate said plurality of door profile data points for storage in said nonvolatile memory.

5. The system according to claim 4, wherein said predetermined threshold value is about +/-15 pounds, such that when the garage door is driven from a closed position to an open position and the threshold value is exceeded said motor stops transfer of the garage door and when the garage door is transferring from the open position to the closed position and the threshold value is exceeded said motor stops and reverses the garage door.

6. The system according to claim 1, further comprising:
a sensor for detecting movement of the garage door between the first and second positions, said sensor coupled to said controller means, wherein said sensor continuously emits and receives a signal which detects non-movement of the garage door when successive received signals are of substantially a same characteristic.

7. An internal entrapment system for a sectional door movable between a closed position proximate a door frame and an open position displaced therefrom, wherein the door frame includes vertically spaced apart jamb members connected at their tops by a horizontal header, comprising:
a housing affixed to the horizontal header;
a counter-balancing system which has a motor with a drive gear carried by said housing;
a drive shaft coupled to said drive gear, said drive shaft coupled to the door for moving the door from the closed position to the open position and said drive shaft freely rotating when the weight of the door is released as it moves from the open position t the closed position;
a potentiometer having a slider element coupled to said drive gear to provide a plurality of positional locations of the door as the door moves between the open and closed positions;
a pulse counter coupled to said drive shaft to detect the speed thereof; and
a controller connected to said motor, said potentiometer and said pulse counter, said controller determining a torque value applied by said drive shaft from said pulse counter and associating the torque value with each said plurality of positional locations of the door determined by said potentiometer, wherein said controller takes corrective action if the difference between the motor torque value for one of said plurality of positional locations and one of a plurality of door profile data points associated with each of said plurality of positional locations exceeds a predetermined threshold, and wherein said controller updates said plurality of door profile data points to the motor torque values for each respective said plurality of positional locations if the predetermined threshold is not exceeded by any of the differences between the motor torque values and said plurality of door profile data points.

8. The internal entrapment system according to claim 7, further comprising:
a nonvolatile memory connected to said controller for storing said plurality of door profile data points; and
means for initially establishing said plurality of door profile data points by activating said motor to initiate movement between the open and closed positions while said controller means collects data from said potentiometer, and said pulse counter to calculate said plurality of door profile data points for storage in said nonvolatile memory.

9. The internal entrapment system according to claim 8, further comprising:
a thermistor directly connected to said controller for detecting an ambient temperature value, wherein said thermistor is separate from the operation of said motor and which is employed to offset each of said motor torque values for each of said plurality of positional locations to compensate for any frictional drag of the door between the open and closed positions as a result of a change in temperature.

10. The internal entrapment system according to claim 9, further comprising:
a sensor for detecting movement of the garage door between the open and closed positions, said sensor coupled to said controller, wherein said sensor continuously emits and receives a signal which detects non-movement of the garage door when successive received signals are of substantially the same magnitude of a monitored characteristic.

11. The internal entrapment system according to claim 10, wherein said controller takes corrective action when either said sensor detects non-movement of the garage door or said predetermined threshold is exceeded.

12. An internal entrapment system used with an open-loop garage door operator for at least stopping motion of a sectional garage door during a closing or opening cycle when the door is interfered with by an obstruction, comprising:

means for moving the garage door between an open position and a closed position, wherein said moving means includes a motor with a drive shaft that only drives the door from said closed position to said open position, said drive shaft freely rotating when the weight of the door is released as the door moves from the open position to the closed position;

a potentiometer coupled to said moving means to detect a plurality of speed values of the moving garage door and to set an upper and a lower limit of door travel, wherein said potentiometer includes a slider element coupled to the door which generates a voltage value that is directly proportional to the door position to establish said upper and lower limits of door travel, and wherein said voltage value changes depending upon the door position and wherein said slider element remains in place even if a power supply is removed from said potentiometer; and a processor with memory to store said plurality of speed readings, said processor calculating a plurality of force values from said plurality of speed values between the upper and lower limits and taking corrective action by controlling said moving means when said processor detects that a force applied by said moving means is beyond a predetermined threshold.

13. The internal entrapment system according to claim 12, further comprising a motor connected to a drive shaft for moving the door between positions, said processor establishing a high speed value and a low speed value during an initial open/close cycle, wherein said processor takes corrective action whenever a calculated speed value exceeds said predetermined threshold beyond one of said high and low speed values.

14. The internal entrapment system according to claim 13, further comprising:

a sensor to monitor motion of the door between open and closed positions, said sensor emitting a signal that is reflected by the door, wherein said sensor receives said reflected signal and said processor compares successive reflected signals to one another and at least stopping movement of the door when said successive signals are similar to one another.

15. An internal entrapment system for a garage door controlled by a garage door operator, comprising:

means for transferring the garage door between vertical and horizontal positions;

an emitter having an unobstructed view of the garage door, said emitter projecting an incident signal toward the garage door which returns a reflected signal;

a receiver for receiving said reflected signal; and a processor for analyzing a plurality of said reflected signals and stopping operation of said transferring means when the analysis reveals that the garage door is no longer moving and said processor receives signals from said transferring means that the garage door should be moving.

16. The internal entrapment system according to claim 15, wherein said processor compares a predetermined characteristic of successive reflected signals, wherein if successive reflected signals have a same magnitude of said predetermined characteristic said processor instructs said transferring means to stop operation.

17. The internal entrapment system according to claim 16, wherein said receiver includes an amplifier to amplify said reflected signals which are submitted to a window comparator which generates a trigger signal when an amplitude of successive reflected signals varies, and wherein said processor signals said transferring means to continue operation as long as said trigger signal is received by said processor.

18. The internal entrapment system according to claim 16, wherein said emitter generates an acoustic signal.

19. A motion-initiated system for a garage door controlled by a garage door operator, comprising:

means for transferring the garage door between vertical and horizontal positions;

an emitter having an unobstructed view of the garage door, said emitter projecting an incident signal toward the garage door which returns a reflected signal;

a receiver for receiving said reflected signal; and a processor for analyzing a plurality of said reflected signals and starting operation of said transferring means from one of an open and closed positions to the other position when the analysis reveals that the movement is initiated by means other than said means for transferring.

* * * * *